P. MEDART,

Assignor of one-third interest to G. W. FISHER

Belt-Pulley.

No. 8,909. Reissued Sept. 30, 1879.

ATTEST:

Robert Burns

Frank Duffy

INVENTOR:

Philip Medart 8,909. BELT-PULLEYS. Philip Medart, St. Louis, Mo., assignor of one-third interest to George W. Fisher. Patent No. 199,848, dated Jan. 29, 1878. Filed Aug. 16, 1879.

*To all whom it may concern:*

Be it known that I, PHILIP MEDART, a resident of St. Louis, Missouri, have made a new and useful Improvement in Belt-Pulleys, of which the following is a full, clear, and exact description, reference being had to the annexed drawings, making part of this specification.

The object of this invention is to overcome several objections that exist to the present mode of forming belt-pulleys of a single piece of cast metal. It is difficult to cast such pulleys so that the rim will be even in thickness and perfectly balanced. Further, in cooling, the rim of the pulley chills in advance of the center or hub, which causes the parts to be strained and weakened, and the rim itself, from the nature of its material, is liable to yield to a centrifugal strain; and this invention consists, first, in forming separately a rim for belt-pulleys from a flat bar or sheet of wrought metal, which after being bent to the required shape is riveted to a spider composed of arms and a hub of any suitable form and construction; secondly, in forming a rim for belt-pulleys of a flat bar or sheet of wrought metal bent to the proper shape, and secured by rivets to a spider consisting of a hub and arms which are cast in a single piece.

Figure 1:
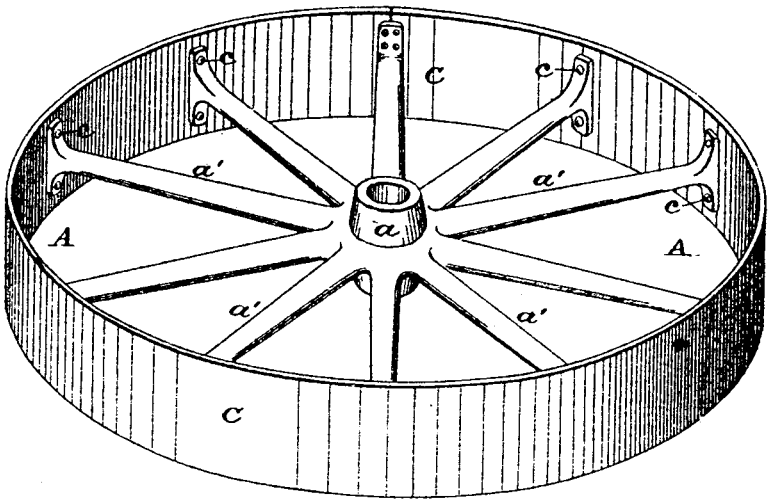
Figure 2:
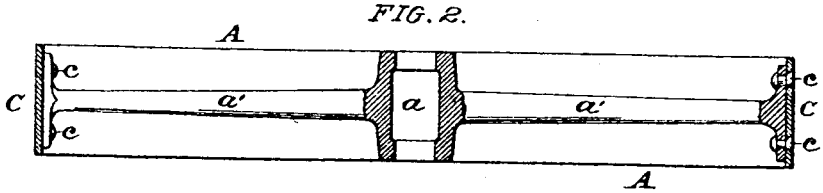

In the drawings, Figure 1 is a side elevation, and Fig. 2 a cross-section, of my improved pulley.

In the accompanying drawings, A represents a belt-pulley made under my improved construction.

In the drawings I have shown the hub *a* and arms *a'* made of a single piece of cast metal.

The rim C is formed from a plain or flat bar or sheet of wrought metal, which is bent to the proper shape and secured to the arms of the spider by means of rivets *c*. By the use of a plate or bar of a flat section the same can be readily and accurately bent or rolled into a true circle in any ordinary bending-machine, and thereby render the production of the pulley cheap and easy.

By my improved construction all the parts of the pulley can be readily and accurately made and fitted together. The rim can be attached to the spider, not only without straining it, but, from the character of its material, be made to greatly strengthen it. The pulley can be made much lighter, weighing but about one-third of what it would if made of cast-iron throughout, and with much less expense. Not only the rim is materially lightened, but the arms also. The method further allows the arms to be readily cast straight—a shape not easily obtained when the arms and rim are in one casting.

The spiders can be made in quantities and kept in stock, and any desired width of rim attached thereto, for the center of a belt-pulley is made in regular sizes, while the face of the pulley is liable to vary in each case.

In some cases the face is of such width as to require a double set of arms and an elongated hub. Such a construction can be readily provided by my method by using two or more of the centers or spiders, placed side by side, and having a single rim of the desired width fastened to them.

Having thus fully described my invention, what I claim is—

1. A rim for belt-pulleys formed wholly of a flat bar or sheet of wrought metal, for the purpose set forth.

2. The combination, in a belt-pulley wheel, of a hub and arms made in one piece of cast metal and a rim of wrought metal, as and for the purpose set forth.

PHILIP MEDART.

Witnesses:
WM. MÉDART,
ROBERT BURNS.